Aug. 1, 1961     M. A. MATTHEWS     2,994,460
BLENDING HOPPER
Filed June 24, 1959
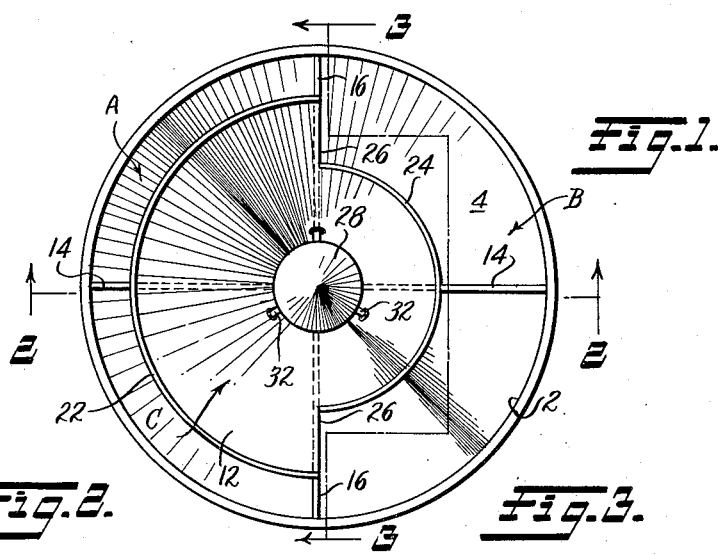
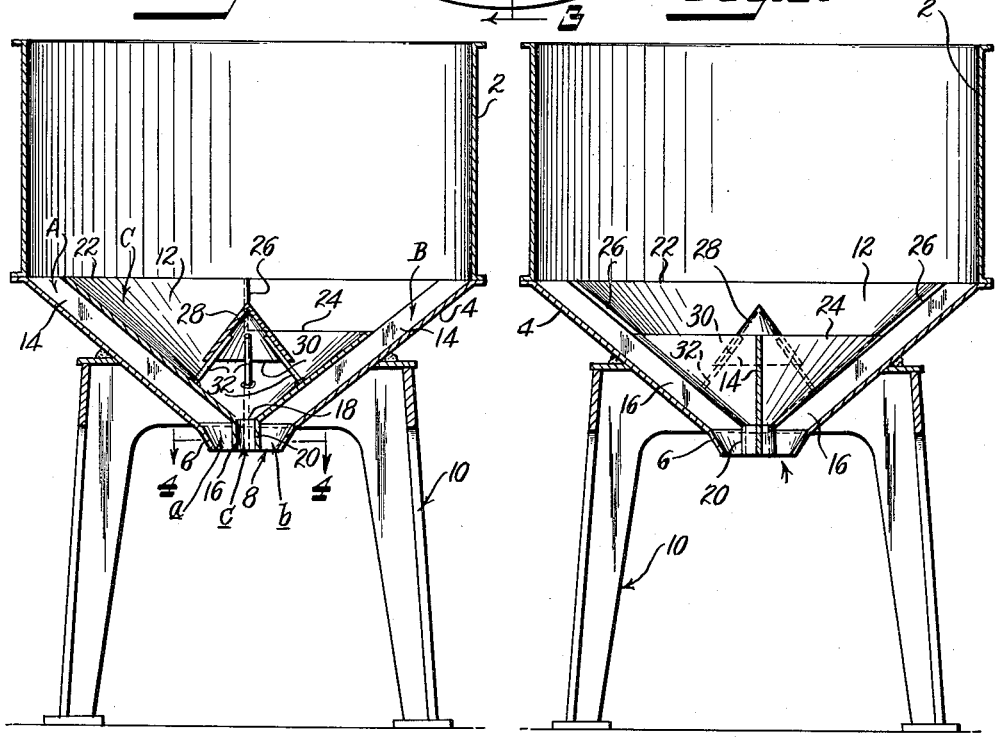
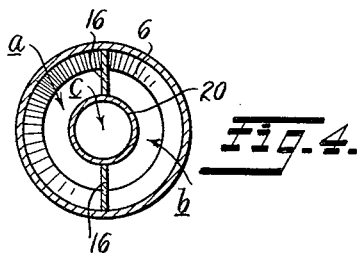
INVENTOR.
*Max A. Matthews*
BY
*Bacon & Thomas*
ATTORNEYS United States Patent Office 2,994,460
Patented Aug. 1, 1961

2,994,460
BLENDING HOPPER
Max A. Matthews, 1608 S. 4th St., Terre Haute, Ind.
Filed June 24, 1959, Ser. No. 822,616
9 Claims. (Cl. 222—145)

This invention relates to blending hoppers for fluent granular material having particles of different size.

In many industries, particularly the coal industry, the preparation of new granular material for its ultimate market is a highly complex and exacting process aimed at maximum uniformity and quality of product. One of the aggravating problems encountered in the handling and processing of coal and other similar materials of varying particle size is size segregation, which occurs when the material is deposited in bulk in any type or form of container such as a storage pile, bin, hopper or railroad car.

When free-flowing granular material having different sized particles is deposited in bulk storage of any type, shape or size, it will form a conical pile having sloping sides which may vary in degree of slope depending on the natural angle of repose of the material. As more and more material flows onto the pile, it spreads uniformly as to mass over the entire surface area of the pile but the individual particles of the mass ranging from fine to coarse will invariably come to rest in or on the pile in direct ratio to their size with the smallest particles becoming static first, followed progressively by increasingly larger particles flowing farther and farther away from the initial point of deposit, under the influence of gravity and the slope of the pile, until they come to rest against restraint. This results in classification as to size with concentration of the finest particles in the center of the pile and increasingly larger particles being deposited farther away from the center with the largest particles at or near the outer limits of the pile. This is commonly referred to as "size segregation."

The general object of this invention is to reclaim by gravity flow granular materials of varying size from storage through a minimum number of reclaiming points and to simultaneously restore the material to approximately its normal or original size consistency.

In general, the device may be used to reclaim from round, square or rectangular bins or hoppers in connection with bin, silo or open storage of free-flowing granular bulk materials of varying size particles.

In principle, the device consists of an auxiliary bottom added to a conventional bin bottom and arranged to cause the simultaneous flow of material from two or more zones and recombining the material in predetermined quantities through a final single discharge opening.

While the present description shows only a blending hopper in which the flows from the different zones are combined into a single stream at the discharge opening, it is to be understood that flow from each of the zones may be separately conducted into individual or separate masses rather than being recombined.

Another object of this invention is to provide a blending hopper of the type set forth that is simple and economical in construction and yet rugged and reliable in operation.

Further and additional objects and advantages will become apparent to those skilled in the art as the description proceeds with reference to the accompanying drawings, wherein:

FIG. 1 is a top plan view of a preferred embodiment of the invention;

FIG. 2 is a vertical sectional view taken substantially along the line 2—2 of FIG. 1;

FIG. 3 is a vertical sectional view taken substantially along the line 3—3 of FIG. 1; and FIG. 4 is an enlarged fragmentary horizontal sectional view taken along the line 4—4 of FIG. 2.

A preferred embodiment of the invention, as shown in the drawings, comprises a generally cylindrical main hopper portion having side walls 2 and having a generally conical bottom 4 therein. The bottom 4 is permanently united to the main portion side walls 2, by rivets, welding, or in any other suitable manner and terminates in a sharper or steeper conical portion 6 defining a discharge opening 8 at the bottom of the hopper. The hopper is shown as mounted on a suitable supporting structure 10 for purpose of illustration, it being understood that the hopper may be mounted on any other suitable type of support and may be of other horizontal cross-sectional shapes.

A first baffle member 12 is mounted in the lower portion of the hopper adjacent the bottom 4 but spaced therefrom and substantially parallel thereto. The first baffle 12 comprises a frusto-conical structure mounted and held in place by further baffles 14 and 16. The baffles 14 and 16 are flat plates extending between the first baffle 12 and the sloping bottom 4. The baffles 14 extend only from the upper edge of the baffle 12 to the inlet portion of the discharge opening 8. The baffles 16 on the other hand extend from the upper edge of baffle 12 downwardly through the discharge opening 8 and to the lowermost edge of the portion 6. (FIGS. 3 and 4).

The first baffle 12 is provided with an opening 18 at its lower end and a short length of tubular conduit 20 extending downwardly, as a continuation of the opening 18, through the discharge opening 8 to the lower end thereof. The conduit 20 thus defines an outlet orifice from the interior of first baffle 12. As clearly shown in the drawings, substantially one half of the first baffle 12 extends upwardly with its upper edge portion 22 at substantially the same level as the upper edge of the sloping bottom 4. The other half of the first baffle 12 is cut away so as to define an upper edge 24 spaced downwardly a substantial distance below the level of the top edge of sloping bottom 4 and spaced farther inwardly from side walls 2 than is the edge portion 22. The juncture between the edge portions 22 and 24 is defined by a pair of opposite vertical shoulders or offsets 26.

The baffles 16, previously described, are substantially coincident with the shoulders or offsets 26 whereby they divided the space between the baffle 12 and the bottom 4 into two separate flow paths extending downwardly from different zones on opposite sides of the hopper. From FIG. 1 it is apparent that the upper edge portion 22 and the upper edge portion 24 divide a horizontal projection of the transverse area of the hopper into separate zones bounded exteriorly by main portion side walls 22 and comprising entry throats to different flow paths. The throats are identified by characters A, B and C, respectively. It is to be noted that throat A is an outer peripheral throat of arcuate shape, throat B is also an outer peripheral throat of arcuate shape and of greater horizontal width than throat A, and throat C is a central throat bounded by throats A and B. Throat A defines an entry for the coarsest material into one flow path extending from that throat to an outlet orifice *a* (see FIG. 2). Throat B defines an entrance to a second flow path for some coarse and some intermeditae material and which extends to outlet orifice *b*. The throat C defines an entrance to a flow path extending therefrom to outlet orifice *c* defined by conduit 20.

A central baffle 28 is of upwardly pointed conical shape and is mounted within first baffle 12 centrally therewith its lowermost edge 30 spaced from the adjacent surface of the baffle 12. The central baffle 28 may be supported in fixed position by a plurality of rigid rods 32 welded or otherwise secured to the baffle 28 and baffle 12. The central baffle 28 serves to insure that the material supported on baffle 12 and flowing to outlet orifice c originates through a representative area of the central throat C. If it were not for the baffle 28 there would be a tendency for only the fine materials at the center of the pile in the hopper to flow to the orifice c.

With the structure thus far described it will be apparent that the granular material to be stored and later withdrawn may be deposited in the main hopper. Even though that material tends to segregate as to size, as previously described, the baffle structure described causes flow from the different zones wherein the different sizes collect to return proportional quantities from those zones to the outlet opening whereby the total material withdrawn through discharge opening 8 has substantially the same proportion of each size of the particles as the original material deposited in the hopper.

As previously stated with reference to FIG. 1, the different zones constituting the entrance throats for the different flow paths are horizontal cross-sectional area divisions of the hopper within side walls 2. In actual operation material flows uniformly from a cross-section of each zone and through an area equivalent to the area of the throat opening at the entrance to that zone. The width or depth of the throat opening, that is, the distance between a baffle and the hopper bottom or between baffles, is usually and preferably fixed at a minimum of about 2½ times the maximum particle size of the material to be passed through that zone. The length of the throat opening is the length of the arc measured along the center of the throat. The discharge opening 8 of the hopper is divided by the described baffles and conduit into three equal cross-sectional areas, each constituting an outlet orifice for one of the flow paths from a corresponding zone. It will be observed that the outlet orifice areas are relatively small, whereas the throat openings for each corresponding zone have relatively great cross-sectional areas. In operation the smaller area of the outlet orifice controls the volume of flow from each zone while the "pull-down" of material is uniform and in direct ratio to the cross-sectional area of the throat openings at the top of each flow path. For example, in a bin 20 ft. in diameter handling 4" x 0" coal, the outlet orifice a from zone A has an area of 3 sq. ft. The throat A itself has an area of 28 sq. ft. It is apparent that the material flowing through the orifice is made up in volume of material being removed from an area approximately nine times the area of the orifice. It should be noted that this ratio will vary from zone to zone and the ratio would be greater in larger bins and less in smaller bins. With an accurate sieve analysis of the material to be handled, it is possible to calculate the areas of the outlet orifices to achieve the optimum volume of material from each zone.

While a single specific embodiment of the invention has been shown and described herein, it is to be understood that other modifications may be reorted to within the scope of the appended claims.

I claim:

1. A blending hopper for granular material having particles of different sizes, comprising: a main hopper having side walls and a bottom adapted to receive and hold bulk granular material, a discharge opening in the bottom of said hopper, said bottom defining a downwardly sloping surface terminating at its lower end in said discharge opening, baffle means in the lower portion of said hopper and defining a plurality of separate flow paths from different horizontal areas of said hopper to said discharge opening, said baffle means including a first baffle substantially parallel to and spaced from said sloping surface, said first baffle extending to said discharge opening and the upper edge of said baffle dividing the horizontal area of said hopper into separate zones.

2. A blending hopper as defined in claim 1, including further baffles extending between said sloping surface and said first baffle and dividing the space therebetween into certain of said plurality of separate flow paths.

3. A blending hopper for granular material having particles of different sizes, comprising; a main hopper having side walls and a bottom adapted to receive and hold bulk granular material, a discharge opening in the bottom of said hopper, means dividing said discharge opening into a plurality of separate discharge orifices, partition forming baffle means in said hopper having walls extending from a position above said discharge opening downwardly to said opening, the upper edges of said walls being connected to divide the horizontal area of said hopper into separate zones at, respectively, the outer peripheral portion and the central portion thereof, said baffle means further defining separate flow paths from said respective zones to said discharge orifices, for simultaneous discharge therefrom, said walls dividing the hopper into a first relatively narrow arcuate zone extending part way around the periphery of said hopper, a second arcuate zone, wider than said first zone, extending the rest of the way around the periphery of said hopper, and a central zone bounded by said arcuate zones.

4. A blending hopper as defined in claim 3, wherein each of said flow paths defined by said walls terminates in an outlet orifice in said discharge opening, all said outlet orifices being of substantially equal cross-sectional area.

5. A blending hopper for granular material having particles of different sizes, comprising; a main hopper having side walls and a generally conical downwardly converging bottom, a discharge opening at the lower terminus of said bottom, a generally conical first baffle in said hopper substantially parallel to but spaced from said bottom, having an outlet orifice over said discharge opening, and having a first upper edge portion at substantially the same level as the upper edge of said bottom, a portion of said baffle being cut away whereby a second edge portion thereof is at a level below the upper edge of said bottom.

6. A blending hopper as defined in claim 5, including further baffles extending between said first baffle and said bottom from the juncture between said first and second upper edge portions to said discharge opening.

7. A blending hopper as defined in claim 5, wherein said first baffle is provided with an outlet conduit extending from said outlet orifice downwardly into said discharge opening, the lower ends of said further baffles extending to said conduit and into said discharge opening whereby said discharge opening is divided into at least three orifices.

8. A blending hopper as defined in claim 7, wherein said orifices are all of substantially the same cross-sectional area.

9. A blending hopper as defined in claim 7, including an upwardly converging generally conical baffle mounted centrally within said first baffle and with its lower edge spaced from said first baffle.

References Cited in the file of this patent
UNITED STATES PATENTS

| 1,663,173 | Pioda | Mar. 20, 1928 |

FOREIGN PATENTS

| 502,663 | Italy | Dec. 1, 1954 |
| 521,025 | Great Britain | May 9, 1940 |
| 999,118 | France | Oct. 3, 1951 |